(12) United States Patent
Bisesti et al.

(10) Patent No.: US 9,194,532 B2
(45) Date of Patent: Nov. 24, 2015

(54) SECURITY SENSOR HAVING ADJUSTABLE RETAINING ARMS

(75) Inventors: Robert Bisesti, Charlotte, NC (US); David N. Berglund, Charlotte, NC (US); Karl Lindroth, Monroe, NC (US)

(73) Assignee: InVue Security Products Inc., Charlotte, NC (US)

( * ) Notice: Subject to any disclaimer, the term of this patent is extended or adjusted under 35 U.S.C. 154(b) by 229 days.

(21) Appl. No.: 13/600,419

(22) Filed: Aug. 31, 2012

(65) Prior Publication Data

US 2014/0060218 A1 Mar. 6, 2014

(51) Int. Cl.
| | |
|---|---|
| *G08B 13/14* | (2006.01) |
| *A47B 96/06* | (2006.01) |
| *E04G 3/00* | (2006.01) |
| *F16M 11/04* | (2006.01) |
| *G01D 11/24* | (2006.01) |
| *F16M 11/22* | (2006.01) |
| *F16M 13/00* | (2006.01) |
| *A47F 7/024* | (2006.01) |

(52) U.S. Cl.
CPC .............. *F16M 11/04* (2013.01); *A47F 7/024* (2013.01); *F16M 11/041* (2013.01); *F16M 11/22* (2013.01); *F16M 13/00* (2013.01); *G01D 11/245* (2013.01)

(58) Field of Classification Search
CPC ....... H02G 3/125; F16M 11/04; F16M 13/02; F16M 11/10; F16M 11/12; B60N 3/102; A47G 1/17
USPC ............ 340/568.1, 571, 568.8, 572.1, 572.9, 340/545.6; 70/57.1, 58, 19, 275, 15; 73/865.8; 248/274.1, 298.1, 122.1, 248/205.1, 123.11, 291.1, 676, 310, 311.2, 248/205.3; 361/679.58, 807
See application file for complete search history.

(56) References Cited

U.S. PATENT DOCUMENTS

| | | | | |
|---|---|---|---|---|
| 5,052,199 A | * | 10/1991 | Derman | E05B 73/0082 70/19 |
| 5,595,074 A | * | 1/1997 | Munro | 70/58 |
| 5,615,854 A | * | 4/1997 | Nomura | F16M 11/10 248/205.3 |
| 6,281,417 B1 | * | 8/2001 | Ladao | G10G 5/00 211/85.6 |
| 6,402,111 B1 | * | 6/2002 | Stewart | A47B 21/0314 248/295.11 |

(Continued)

FOREIGN PATENT DOCUMENTS

WO 2011032147 A2 3/2011

OTHER PUBLICATIONS

Jin Ho Park, International Search Report, Mar. 15, 2013, pp. 1-9, Korean Intellectual Property Office, Daejeon Metropolitian City, Republic of Korea.

*Primary Examiner* — Hoi Lau
(74) *Attorney, Agent, or Firm* — InVue Security Products Inc.

(57) ABSTRACT

A merchandise display security device for displaying and protecting articles of merchandise includes a security sensor having adjustable retaining arms for securely retaining articles of merchandise having various dimensions. Each of the opposed retaining arms includes a grip portion at a first end and a rack portion at a second end opposite the grip portion that operatively engages a rotatable pinion gear. The rack portions are disposed about the pinion gear such that the retaining arms are moveable in a lateral direction in opposite directions to accommodate articles of merchandise having various widths. The retaining arms are rotatably disposed within a base portion and a cap portion removably attached to the base portion such that the retaining arms are rotatable about a lateral axis to accommodate articles of merchandise having various thicknesses.

20 Claims, 7 Drawing Sheets

(56) References Cited

U.S. PATENT DOCUMENTS

| | | | | |
|---|---|---|---|---|
| 6,789,832 B2* | 9/2004 | Gort | B60R 11/00 224/547 | |
| 7,014,199 B2* | 3/2006 | Hendzel | B65B 3/106 248/131 | |
| 7,540,464 B2* | 6/2009 | Samari | 248/445 | |
| 7,829,775 B2* | 11/2010 | Morrow | A47F 7/00 84/327 | |
| 8,061,164 B2* | 11/2011 | Johnston et al. | 70/58 | |
| 8,302,261 B2* | 11/2012 | Ma | G06F 1/1681 16/308 | |
| 8,649,169 B2* | 2/2014 | Kwon et al. | 361/679.41 | |
| 8,711,553 B2* | 4/2014 | Trinh et al. | 361/679.02 | |
| 8,783,973 B2* | 7/2014 | Pizzo | G03B 17/00 248/187.1 | |
| 2005/0236541 A1* | 10/2005 | Chang | B60R 11/00 248/231.81 | |
| 2009/0090839 A1* | 4/2009 | Lin | 248/676 | |
| 2009/0159769 A1* | 6/2009 | Lee | E05B 73/0082 248/310 | |
| 2010/0079285 A1* | 4/2010 | Fawcett et al. | 340/568.1 | |
| 2010/0118144 A1 | 5/2010 | Fawcett et al. | | |
| 2011/0024371 A1 | 2/2011 | Lampman et al. | | |
| 2011/0100073 A1 | 5/2011 | Johnston et al. | | |
| 2011/0147324 A1 | 6/2011 | Sankey et al. | | |
| 2011/0185776 A1* | 8/2011 | Mahaffey | E05B 73/0005 70/58 | |
| 2013/0043356 A1* | 2/2013 | Kuhn et al. | 248/206.5 | |
| 2013/0187024 A1* | 7/2013 | Obujen | A47B 23/002 248/693 | |
| 2013/0277520 A1 | 10/2013 | Funk et al. | | |
| 2013/0301216 A1* | 11/2013 | Trinh et al. | 361/679.58 | |
| 2014/0060218 A1* | 3/2014 | Bisesti et al. | 73/865.8 | |

\* cited by examiner

SECURITY SENSOR HAVING ADJUSTABLE RETAINING ARMS

FIELD OF THE INVENTION

This invention relates generally to merchandise display security devices for displaying and protecting articles of merchandise from theft. More particularly, the invention is a merchandise display security device including a security sensor having adjustable retaining arms for securely retaining articles of merchandise having various dimensions.

BACKGROUND OF THE INVENTION

Retailers routinely display relatively expensive electronic articles of merchandise, for example cellular phones, personal data assistants (PDAs), global positioning satellite (GPS) navigation devices, audio and video media players (e.g. MP3 players), tablet computers, e-readers and the like, for a potential purchaser to examine before making a purchase. The articles of merchandise are generally lightweight and relatively small so as to be readily transportable. Accordingly, retailers commonly refer to such portable items as "handheld merchandise." In certain instances, the retailer desires the electronic article of merchandise to be displayed in a powered state so that potential purchaser can also evaluate the features and functions of the merchandise. For example, the retailer might desire to permit a potential purchaser to experience the video and graphics quality of a tablet computer, or the sound quality of an MP3 player. At the same time, the retailer does not want the operational article of merchandise being displayed to be stolen or removed from the display area by an unauthorized person. Accordingly, the article of merchandise is electrically coupled to a power source and is physically attached to a merchandise display security device that protects the article from theft or removal. Oftentimes, the merchandise display security device is configured to provide the electrical power from the power source to the article of merchandise.

The merchandise display security device typically includes a security sensor that is attached to the article of merchandise and houses an electronic sensor element and monitoring electronics for monitoring whether the article remains securely attached to the security sensor. In the event that the article of merchandise is detached from the security sensor, an audible and/or visible alarm is activated to alert store personnel of a possible theft or removal. Depending on limitations of the size of the security sensor, the monitoring electronics and alarm may be located within a separate display stand, alarm module, distribution module (e.g. splitter box) or the like. The merchandise display security device typically includes a power cord electrically connected between the power source and the security sensor. In certain instances, the security sensor includes regulating electronics for providing electrical power to the article of merchandise at an appropriate operating current and/or voltage, typically through a power adapter cord electrically connected between the security sensor and the article of merchandise. In such instances, the monitoring electronics of the merchandise display security device may also monitor whether the electrical continuity of either the power cord or the power adapter cord is interrupted, and activate an audible and/or visible alarm to alert store personnel of a possible theft or removal.

Articles of merchandise displayed by retailers are manufactured with different sizes, shapes and dimensions. Handheld merchandise, in particular, has a wide array of dimensions, namely widths and thicknesses. Accordingly, merchandise display security devices have employed a relatively thin layer of pressure sensitive adhesive (PSA), commonly known as double-sided tape, that can be sized and shaped as needed to attach the article of merchandise to the security sensor. Double-sided tape, however, is vulnerable to being defeated by a potential thief. Merchandise display security devices using double-sided tape are especially vulnerable to defeat when the surface area available for attachment of the article of merchandise to the security sensor is relatively small. For example, a potential thief may separate the article of merchandise from the security sensor by inserting a thin sharp object, such as a knife blade, between the article of merchandise and the double-sided tape, or alternatively, between the security sensor and the double-sided tape. Furthermore, if the surface area of the double-sided tape is relatively small compared to the surface area for attachment of the article of merchandise, a potential thief may overcome the adhesion of the double-sided tape by applying an excessive torque or bending moment.

Additional disadvantages exist with merchandise display security devices that rely on the adhesion of double-sided tape to attach an article of merchandise to a security sensor. By way of example, store personnel may inadvertently attach the security sensor to a removable component, such as a battery compartment door, of the article of merchandise. As a result, a thief is able to easily separate the article of merchandise from the removable component and the security sensor without activating the alarm. Another disadvantage is that the double-sided tape typically remains adhered to the smaller security sensor when the article of merchandise is intentionally detached from the security sensor, for example when store personnel are attempting to reconfigure the merchandise display security device with another article of merchandise. Removing the double-sided tape and preparing (e.g. cleaning) the surface of the security sensor for attachment to another article of merchandise can be difficult and time consuming. As such, store personnel may be tempted to attach the subsequent article of merchandise to the security sensor utilizing the existing double-sided tape. As a result, the mechanical strength of the adhesive bond between the article of merchandise and the security sensor is compromised.

Accordingly, there exists a need for an improved merchandise display security device for displaying and protecting articles of merchandise from theft. There exists a specific need for a merchandise display security device for displaying electronic articles of merchandise in a retail store for purposes of evaluation by a potential purchaser, while protecting the article of merchandise from theft or removal. There exists a particular need for a merchandise display security device for displaying and protecting different articles of merchandise having various dimensions. Specifically, a merchandise display security device including a security sensor having adjustable retaining arms is needed for securely retaining articles of merchandise having various dimensions, namely widths and thicknesses, while preventing theft or removal of the article of merchandise from the display by a thief or other unauthorized person.

DETAILED DESCRIPTION OF EXEMPLARY EMBODIMENTS

Figure 1:
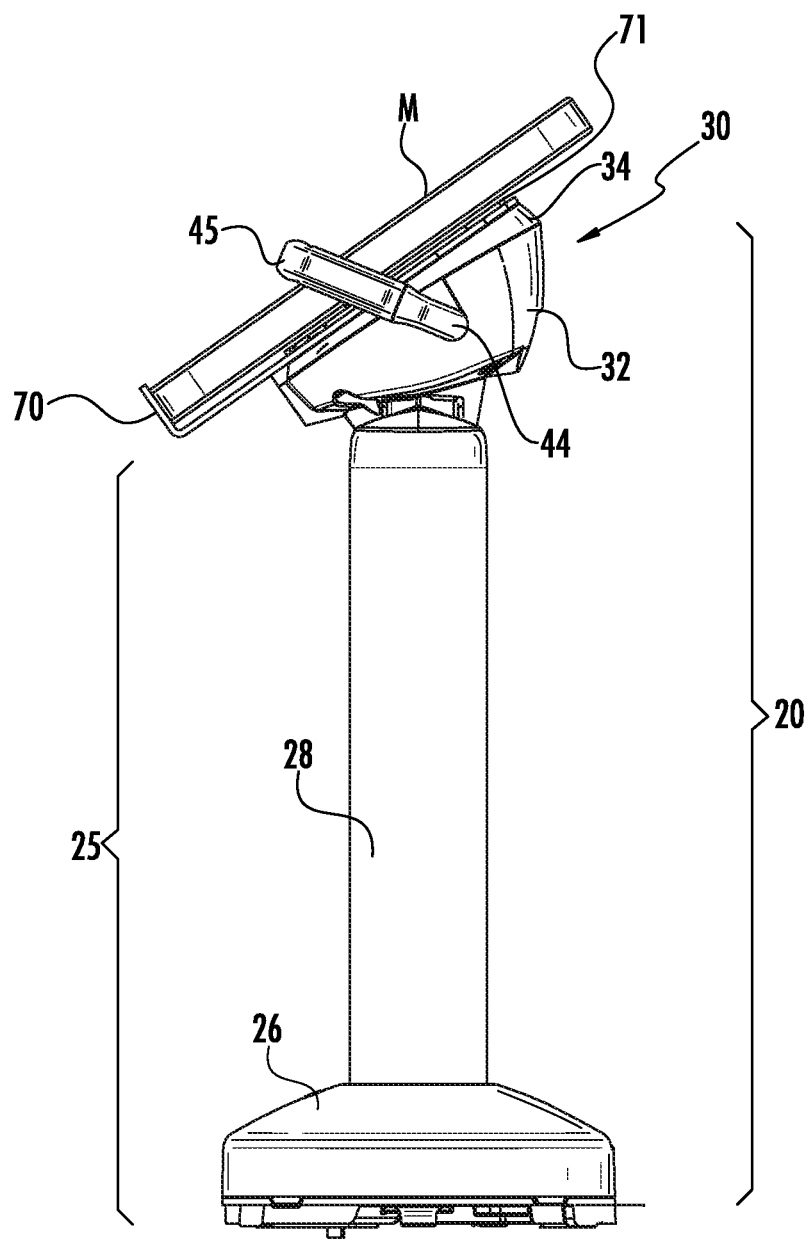
FIG. 1 is an elevation view of an exemplary embodiment of a merchandise display security device including a security sensor having adjustable retaining arms for displaying and protecting articles of merchandise having various dimensions according to the present invention.

Referring now to the accompanying drawing figures wherein like reference numerals denote like elements throughout the various views, one or more exemplary embodiments of merchandise display security systems for displaying and protecting an article of merchandise are shown. More particularly, the drawing figures show exemplary embodiments of a merchandise display security device for displaying and protecting different articles of merchandise having various dimensions, namely widths and thicknesses. In certain instances, the merchandise display security device includes a security sensor having a sensor element electrically coupled to monitoring electronics for monitoring the sensor element and for activating an audible and/or visible alarm in the event that the article of merchandise is separated (detached) from the security sensor. In still other instances, the merchandise display security device provides electrical power to an electronic article of merchandise at an appropriate operating current and/or voltage. The electrical power may be delivered to the electronic article of merchandise through a power cord electrically connected between a power source and the security sensor, and subsequently through a power adapter cord electrically connected between the security sensor and the electronic article of merchandise. In such instances, the monitoring electronics may also monitor whether the electrical continuity of either the power cord or the power adapter cord is interrupted and activate an audible and/or visible alarm to alert store personnel of a possible theft or removal.

FIG. 1 shows an exemplary embodiment of a merchandise display security device 20 for displaying an article of merchandise in a retail store and for protecting the article of merchandise from theft or removal by an unauthorized person. The merchandise display security device 20 is adapted to be secured to a display fixture, such as a counter, table, shelf, wall or the like (not shown), in a known manner, for example by mechanical fasteners and/or a pressure sensitive adhesive (PSA). As shown, the merchandise display security device 20 is an above-the-counter, "stand-alone" security device of the type manufactured and available from InVue Security Products Inc. of Charlotte, N.C., comprising a display stand 25 and a security sensor 30 adapted to be supported on the display stand in a desired orientation for display to a potential purchaser of an article of merchandise M attached to the security sensor. As shown, the display stand 25 includes a base 26 and a pedestal 28 depending upwardly from the base. The pedestal 28 may be provided in various shapes and dimensions, namely heights, for supporting the security sensor 30 in the desired orientation. Alternatively, the pedestal 28 may be eliminated and the security sensor 30 may be supported directly on the base 26 in a similar manner. In another alternative embodiment, the security sensor 30 may be supported directly on the display fixture. If used in conjunction with display stand 25, the security sensor 30 may be fixedly supported on the base 26 or the pedestal 28. Alternatively, the security sensor 30 may be removably supported on the base 26 or the pedestal 28. If removably supported, the security sensor 30 may comprise an extensible power cord 35 (FIG. 2 and FIG. 3) for electrically connecting the security sensor to the display stand 25, or as shown and described herein, to an external power source, such as a transformer electrically coupled to a conventional power outlet in a known manner.

Figure 2:
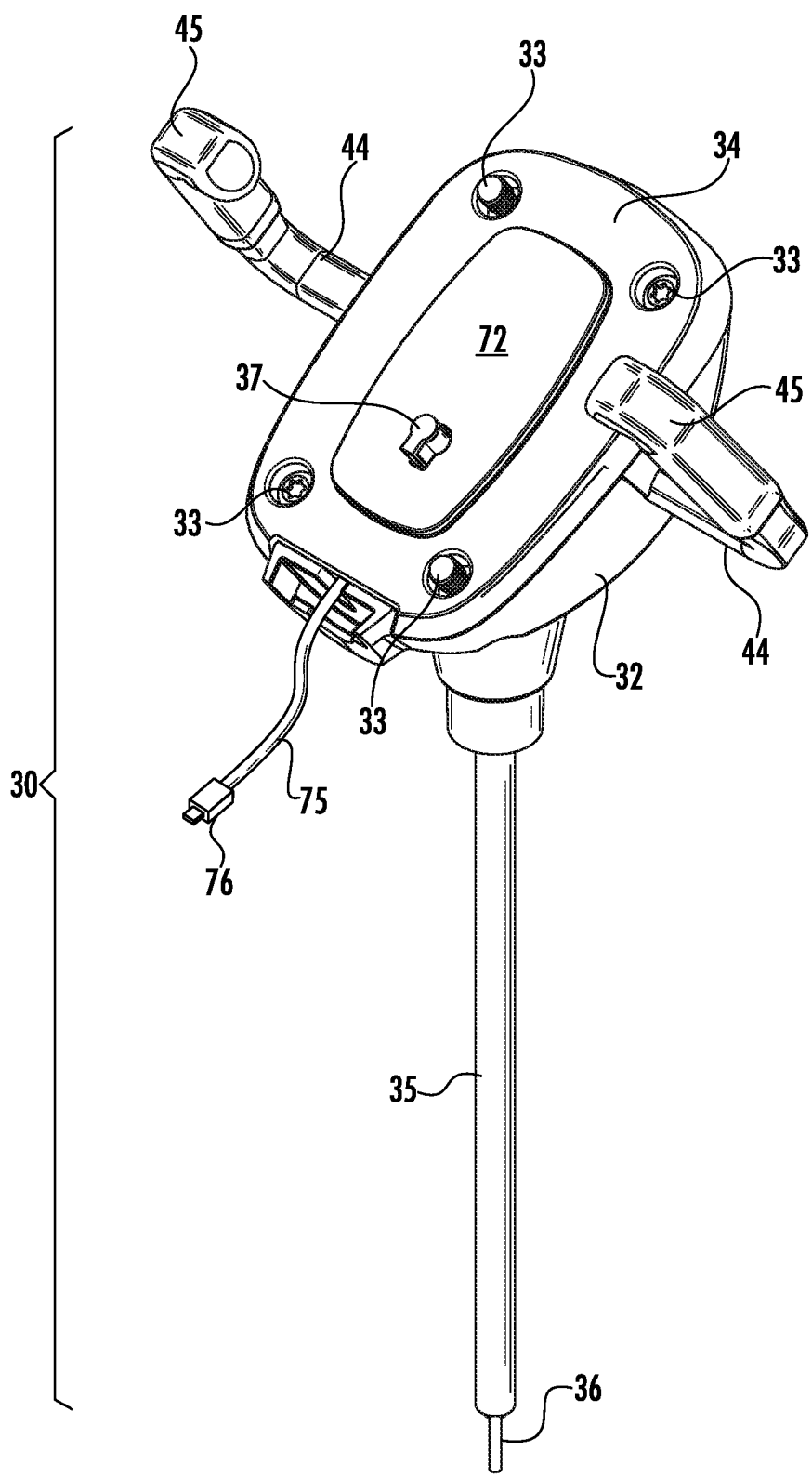
FIG. 2 is a perspective view of the security sensor of the merchandise display security device of FIG. 1.
Figure 3:
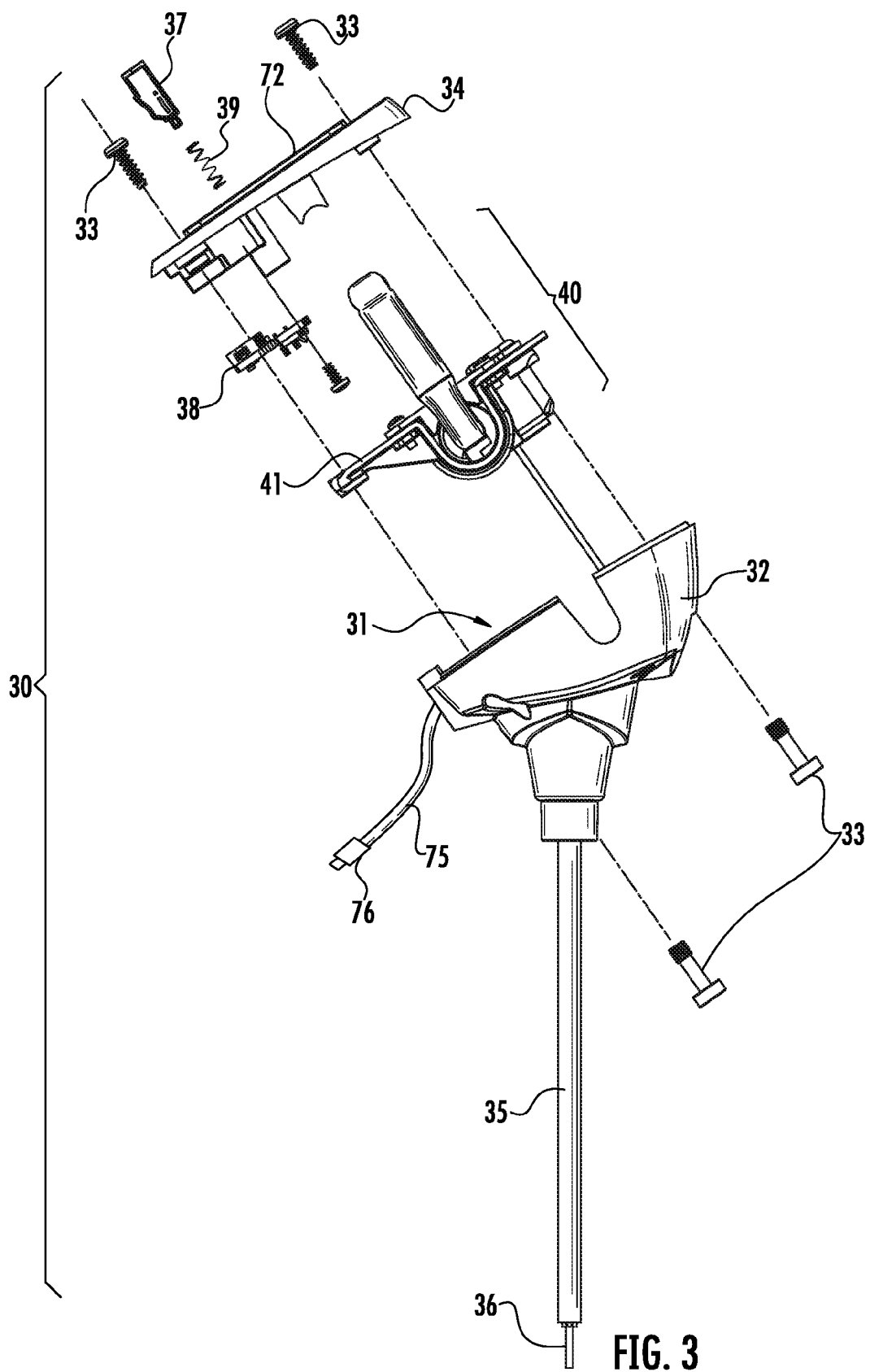
FIG. 3 is an exploded elevation view of the security sensor of FIG. 2 showing an adjustable retaining arms assembly disposed within a housing of the security sensor.

FIG. 2 is a perspective view of the security sensor 30 and FIG. 3 is an exploded elevation view showing the components of the security sensor in greater detail. Security sensor 30 comprises a generally hollow housing 32 defining an internal cavity or compartment 31 for retaining mechanical and electrical components of the security sensor. In particular, an adjustable retaining arms assembly 40 is disposed within the compartment 31 of the housing 32 and retained therein by a removable cover 34 secured to the housing by mechanical fasteners 33. As previously mentioned, security sensor 30 further comprises a power cord 35 having one or more conductors 36 contained within an outer sheath in a conventional manner for electrically connecting the security sensor to an external power source (not shown). The external power source may be a rechargeable battery disposed within the display stand 25, but more commonly is a current and/or voltage transformer electrically coupled to a conventional power outlet. However, security sensor 30 may be electrically connected to any power source in any suitable manner without departing from the intended scope of the present invention. Alternatively, power cord 35 may be a mechanical tether and security sensor 30 may be provided with an internal source of electrical power, such as a conventional battery, for providing an alarm function, as will be described. In still other embodiments, the security sensor 30 may be purely a mechanical merchandise display security device utilizing a mechanical tether 35 to secure an article of merchandise to a display fixture.

In embodiments wherein the security sensor 30 is powered, a sensor element 38 may be provided for determining whether an article of merchandise is attached to the security sensor. As shown herein, sensor element 38 is a conventional pressure or limit switch comprising a plunger 37 that is biased by a coil spring 39 outwardly from the housing 32 of the security sensor 30 through an opening provided in the cover 34. As a result, the plunger 37 is biased in the direction of an article of merchandise attached to the cover 34 of the security sensor 30, in a manner that will be described hereinafter. The sensor element 38 is electrically coupled to monitoring electronics for monitoring a state of the pressure or limit switch. In particular, the monitoring electronics monitor whether the plunger 37 is depressed against the biasing force of the coil spring 39 to indicate an article of merchandise is attached to the security sensor 30, typically a "closed circuit" state of the sensor element 38. In the event the monitoring electronics detects that the plunger 37 is extended by the biasing force of the coil spring 39, typically an "open circuit" states of the sensor element 38, the monitoring electronics may activate an audible and/or visible alarm to alert store personnel to a possible theft or removal of the article of merchandise by an unauthorized person. The monitoring electronics and the audible and/or visible alarm may be disposed within the housing 32 of the security sensor 30, or alternatively, may be located elsewhere, for example within the base 26 of the display stand 25 secured to the display fixture or within a separate alarm module, distribution module (e.g. splitter box) or the like located in a concealed location beneath the display fixture.

Figure 4:
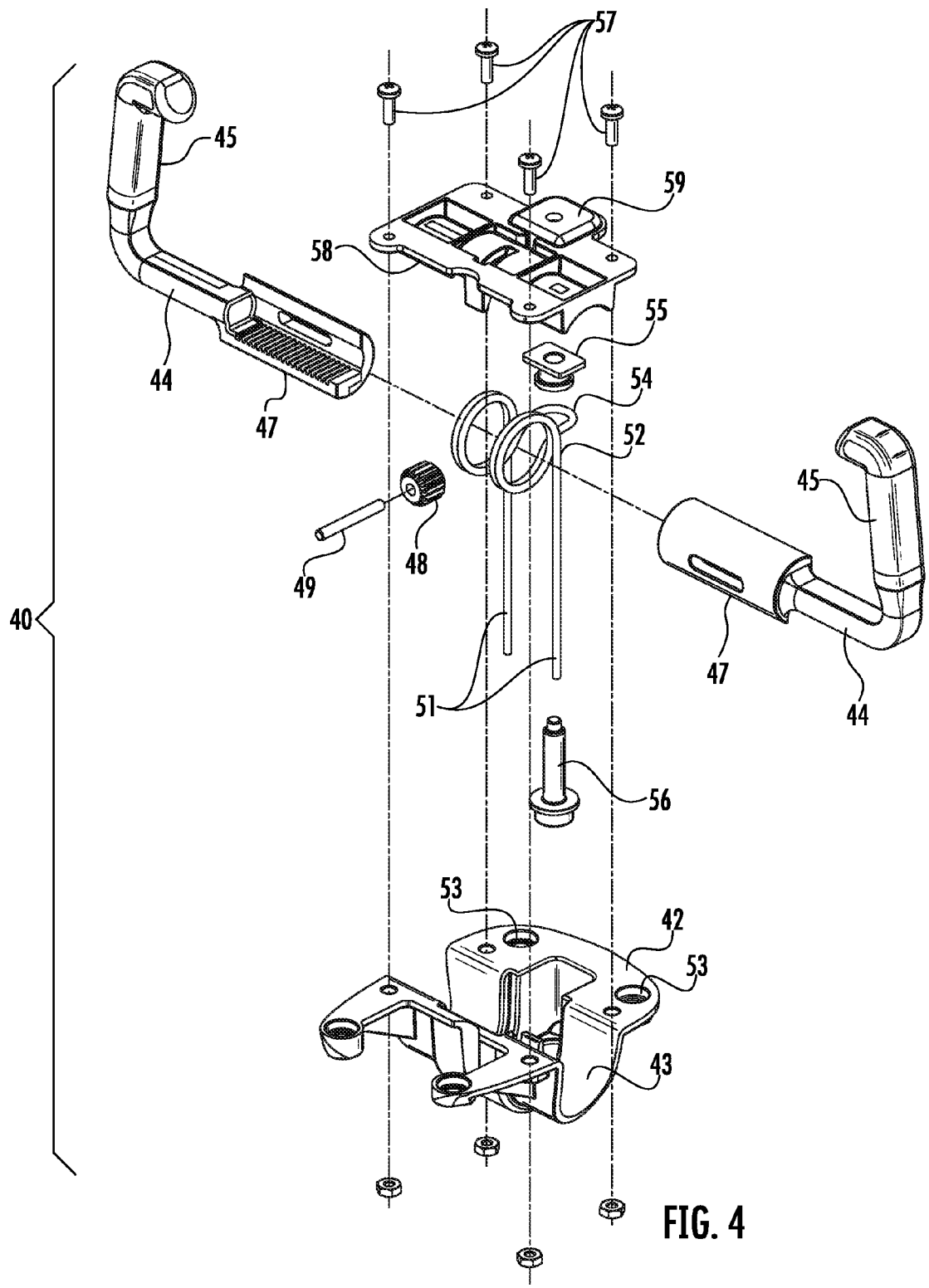
FIG. 4 is an exploded perspective view of an exemplary embodiment of the adjustable retaining arms assembly of FIG. 3.
Figure 5:
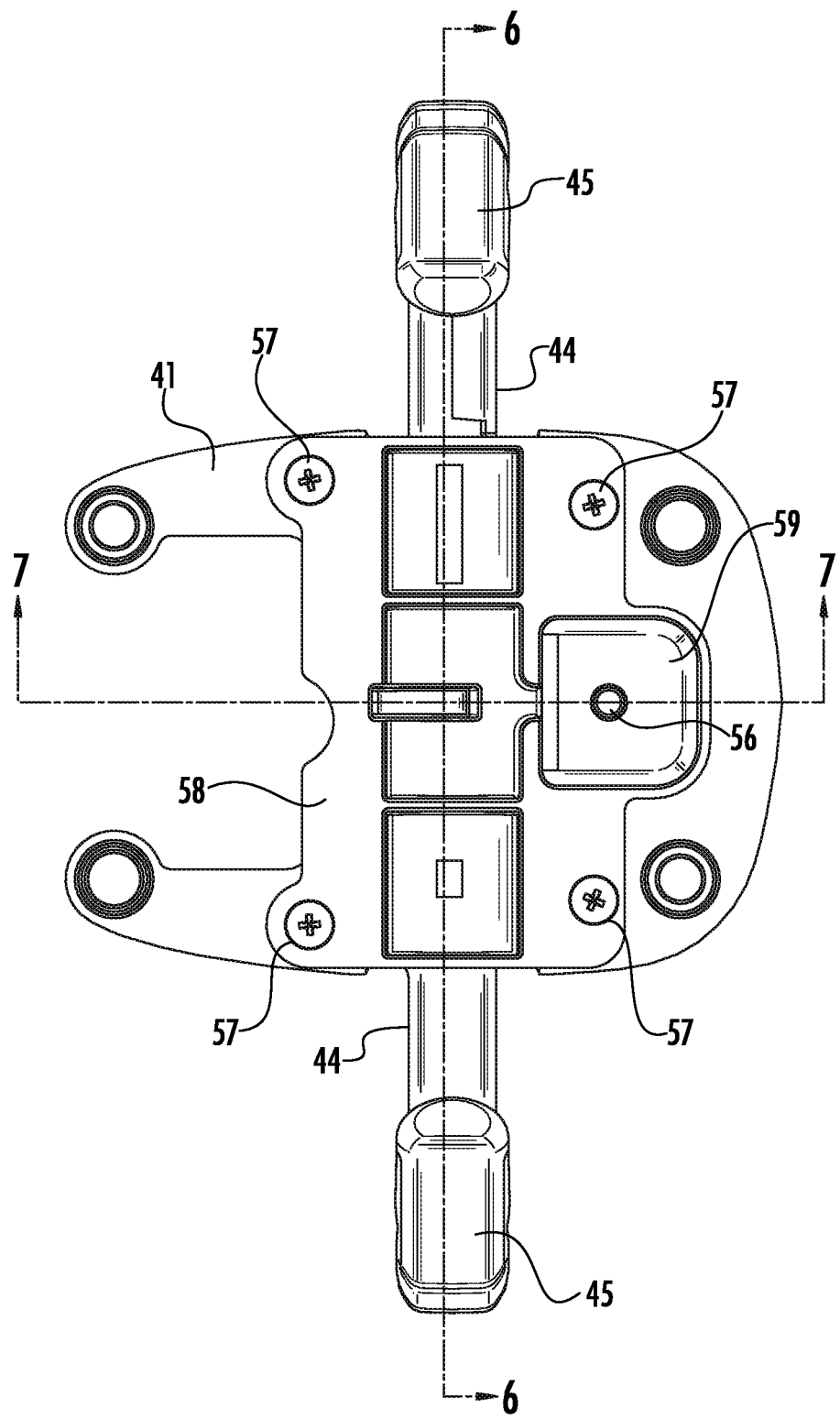
FIG. 5 is a top view of the adjustable retaining arms assembly shown in an assembled configuration on a mounting plate for securing the retaining arms assembly within a housing of the security sensor.
Figure 6:
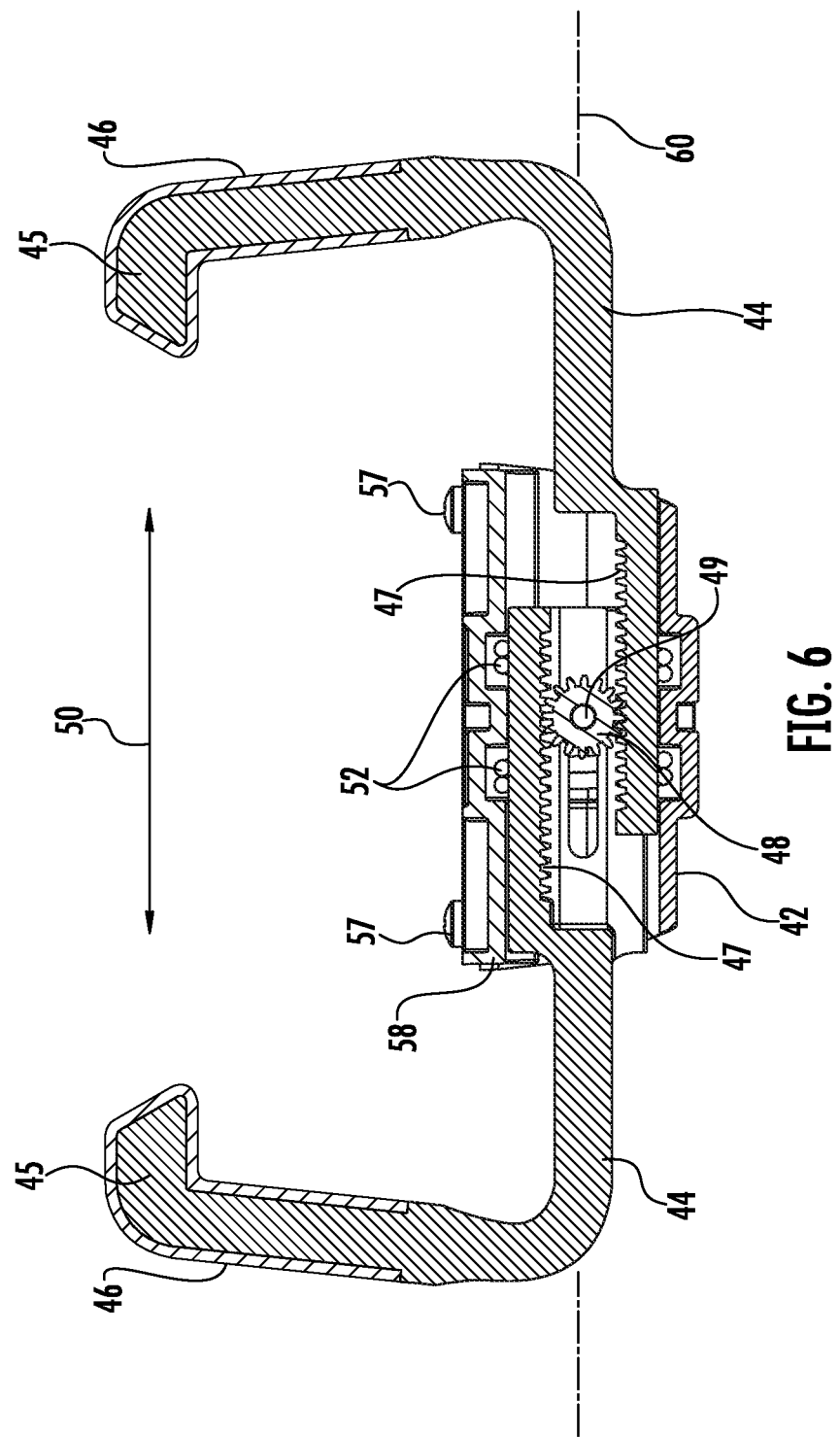
FIG. 6 is a lateral sectional view of the adjustable retaining arms assembly taken along the line 6-6 of FIG. 5.
Figure 7:
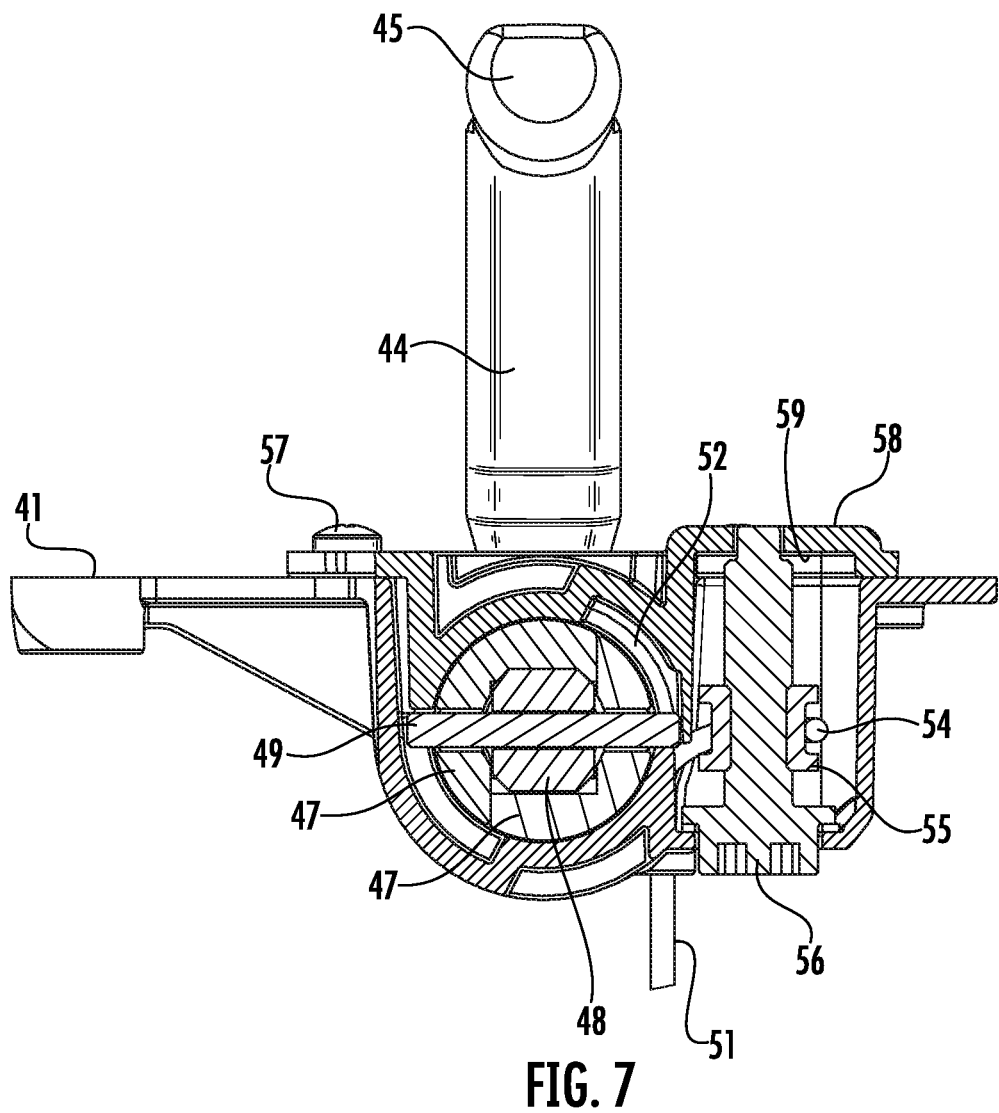
FIG. 7 is a longitudinal sectional view of the adjustable retaining arms assembly taken along line 7-7 of FIG. 5.

FIG. 4 is an exploded perspective view of the adjustable retaining arms assembly 40 of the security sensor 30 shown in FIG. 3. FIG. 5 is a top view of the adjustable retaining arms assembly 40 shown in an assembled configuration on a mounting plate 41 for securing the retaining arms assembly within the housing 32 of the security sensor 30. FIG. 6 is a lateral sectional view of the adjustable retaining arms assembly 40 taken along the line 6-6 in FIG. 5. FIG. 7 is a longitudinal sectional view of the adjustable retaining arms assembly 40 taken along the line 7-7 in FIG. 5. The retaining arms assembly 40 comprises a base portion 42 defining a generally U-shaped channel 43 configured for receiving a pair of opposed retaining arms 44. As best shown in FIG. 6, each of the retaining arms 44 comprises a generally L-shaped grip portion 45 at one end for engaging a lateral edge of an article of merchandise M (FIG. 1). If desired, the grip portions 45 may be over molded with a relatively soft material 46, such as soft plastic or rubber, to protect the exposed surfaces of the article of merchandise M that come into contact with the grip portions. Each of the retaining arms 44 further comprises a rack portion 47 at the end opposite the grip portion 45. The rack portions 47 are configured to simultaneously engage a pinion gear 48 that is rotatably mounted on a spindle 49 and operatively disposed between the opposed rack portions of the retaining arms 44. In this manner, the retaining arms 44 and pinion gear 48 cooperate as a conventional "rack and pinion" gear assembly to provide coordinated movement of the retaining arms in the lateral direction indicated by the double-headed arrow 50 in FIG. 6.

As best seen in FIG. 6, the retaining arms 44 are encircled by one or more coils of a torsion spring 52 disposed on opposite sides of the pinion gear 48. Torsion spring 52 includes a pair of linear legs 51 that depend downwardly into corresponding retaining holes 53 (FIG. 4) formed in the base portion 42. Torsion spring 52 further comprises a connecting loop 54 that is sized and shaped to receive a locking collar 55 of a locking screw 56, for a purpose to be described in greater detail hereinafter. The retaining arms 44, pinion gear 48, spindle 49, torsion spring 52 and locking collar 55 are retained within the base portion 42 by a cap portion 58 that is secured to the base portion by fasteners 57. As such, the retaining arms 44 are freely rotatable about a lateral axis 60 indicated in FIG. 6 between stop positions provided by the base portion 42 and/or the cap portion 58. Furthermore, the retaining arms 44 freely movable in the lateral direction indicated by double-headed arrow 50 in FIG. 6 between the stop positions provided by the ends of the opposed rack portions 47. In this manner, the retaining arms 44 can be moved laterally and rotated such that the opposed grip portions 45 securely engage the lateral sides and top surface of an article of merchandise M when the bottom surface of the article of merchandise is positioned adjacent to the cover 34 of the security sensor 30. The retaining arms 44 are locked to securely retain the article of merchandise M between the grip portions 45 of the retaining arms and the cover 34 of the security sensor 30 by tightening the aforementioned locking screw 56. If desired, the locking screw 56 may be a "tamper-proof" fastener having a proprietary head that can only be engaged by a special tool maintained in the possession of an authorized person. More particularly, the locking screw 56 draws the locking collar 55 disposed about the connecting loop 54 of the torsion spring 52 towards a locking plate 59 provided on the outside of the cap portion 58. Upward movement of the connecting loop 54 causes the coils of the torsion spring 52 to compress around the retaining arms 44, thereby locking the retaining arms against both lateral movement and rotation.

As shown in FIG. 1, the merchandise security device 10 may optionally comprise a generally L-shaped restraining bracket 70 for preventing the article of merchandise M from being forced out from beneath the grip portions 45 of the retaining arms 44 in a direction parallel to the outer surface of the cover 34 of the security sensor 30. The outer surface of the cover 34 of the security sensor 30 may be provided with an elevated land 72 (FIG. 2) and the restraining bracket 70 may have a corresponding recess or opening formed therethrough for receiving the land so as to provide additional resistance to movement of the restraining bracket in a direction parallel to the outer surface of the cover of the security sensor. As illustrated herein in FIG. 1, the article of merchandise M is attached to the restraining bracket 70 by a relatively thin layer of a pressure sensitive adhesive (PSA) 71, such as a double-sided tape. However, it is also envisioned that the restraining bracket 70 may be positioned between a rear surface of the article of merchandise M and the outer surface of the cover 34 of the security sensor 30 without PSA 71. Alternatively, and as previously described, the article of merchandise M may be positioned directly on the outer surface of the cover 34 and attached to the security sensor 30 by only the adjustable retaining arms 44 being retracted in the lateral direction 50 and rotated about the lateral axis 60 such that the grip portions 45 of the retaining arms securely engage the opposed lateral sides and a front surface of the article of merchandise M.

Furthermore, the sensor element 38, including plunger 37 biased by coil spring 39, may be eliminated for cost reduction and/or to reduce the frequency of false alarm conditions caused by movement of the article of merchandise M relative to the outer surface of the cover 34 of the security sensor 30. In instances wherein the sensor element 38 is eliminated, it may also be possible to eliminate the aforementioned monitoring electronics and the associated audible and/or visible alarm. However, it is also possible to provide the security sensor 30 with a power adapter cord 75 (FIG. 2 and FIG. 3) for delivering electrical power to an electronic article of merchandise M from a power source that is external or internal to the merchandise display security device 20. As shown, power adapter cord 75 is permanently connected (i.e. "hard-wired") to the housing 32 of the security sensor 30 and provided with a connector 76 at the free end for coupling to a corresponding connector on the electronic article of merchandise M. Alternatively, a removable and replaceable power adapter cord 75 may be provided with a suitable connector on each end for coupling to the security sensor 30 and the electronic article of merchandise M, respectively. In instances wherein a power adapter cord 75 is provided to deliver electrical power to the electronic article of merchandise M, the security sensor 30 or the display stand 25 of the merchandise display security device 20 may comprise regulating electronics for providing electrical power to the article of merchandise at an appropriate operating current and/or voltage. As such, the monitoring electronics may be retained for the purpose of monitoring whether an electrical signal passing through either power cord 35 or power adapter cord 75 is interrupted.

In view of the above, the merchandise display security device 20 may be configured to provide only physical (i.e. mechanical) security to the article of merchandise M, or a combination of mechanical and electrical security that activates an alarm in the event that the article of merchandise is separated from the security sensor 30, or a combination of mechanical and electrical security that activates an alarm in the event that an electrical signal in either the power cord 35 or a power adapter cord 75 extending between the security sensor and an electronic article of merchandise is interrupted, for example by damaging, cutting or severing the power cord or the power adapter cord.

The foregoing has described one or more exemplary embodiments of a merchandise display security device for displaying and protecting an article of merchandise from theft or removal by an unauthorized person. The illustrative embodiments of the merchandise display security device shown and described herein include a security sensor including adjustable retaining arms for securing articles of merchandise having various dimensions to the security sensor. More particularly, the security sensor comprises opposed retaining arms that are moveable in a lateral direction and rotatable about a lateral axis to secure different articles of merchandise having various dimensions to the security sensor.

Exemplary embodiments of a merchandise display security device and a security sensor including adjustable retaining arms have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A security sensor comprising:
a housing; and
an adjustable retaining arms assembly at least partially disposed within the housing, the retaining arms assembly comprising opposed retaining arms that are moveable in a lateral direction along a lateral axis and are rotatable about the lateral axis such that the retaining arms are positionable for retaining an article of merchandise on the security sensor,
wherein the opposed retaining arms are configured to be adjusted to and locked in one of a plurality of desired lateral and rotational positions relative to the housing.

2. A security sensor according to claim 1, wherein the retaining arms are positionable for retaining a plurality of different articles of merchandise having various dimensions on the security sensor.

3. A security sensor according to claim 1, wherein each of the retaining arms comprises a grip portion at a first end for operatively engaging at least one of a lateral side of the article of merchandise and a front surface of the article of merchandise.

4. A security sensor according to claim 3, wherein each of the retaining arms further comprises a rack portion at a second end opposite the first end for operatively engaging a rotatable pinion gear so as to permit movement of the retaining arms in the lateral direction.

5. A security sensor according to claim4, wherein the pinion gear is disposed between the rack portions of the opposed retaining arms such that the retaining arms are simultaneously moveable in the lateral direction.

6. A security sensor according to claim 1, wherein the retaining arms assembly further comprises a base portion defining a channel for receiving at least a portion of the retaining arms and a cap portion configured for attachment to the base portion such that the retaining arms are rotatably disposed between the base portion and the cap portion to permit rotation of the retaining arms about the lateral axis.

7. A security sensor according to claim 6, the retaining arms assembly further comprising a torsion spring adapted to operatively engage the portion of the retaining arms so as to lock the retaining arms and thereby prevent movement of the retaining arms in the lateral direction and rotation of the retaining arms about the lateral axis.

8. A security sensor according to claim 7, the torsion spring comprising at least one leg portion for engaging the base portion and a connecting loop adapted to receive a locking collar to lock the retaining arms against movement in the lateral direction and rotation about the lateral axis.

9. A security sensor according to claim 8, wherein the locking collar is movably disposed between a locking screw and a locking plate that is engaged by the locking screw to move the locking collar and the connecting loop of the torsion spring to thereby tighten the torsion spring about the portion of the retaining arms received within the channel of the base portion.

10. A security sensor for retaining an article of merchandise, the security sensor comprising:
a housing defining an internal compartment;
an adjustable retaining arms assembly disposed at least partially within the internal compartment of the housing, the retaining arms assembly comprising:
a pair of retaining arms configured to be moveable in a lateral direction along a lateral axis relative to the housing and rotatable about the lateral axis relative to the housing such that the retaining arms are positionable for retaining a plurality of articles of merchandise having various dimensions on the housing,
wherein the pair of retaining arms are configured to be adjusted to and locked in one of a plurality of desired lateral and rotational positions relative to the housing.

11. A security sensor according to claim 10, wherein each of the retaining arms comprises a grip portion at a first end for engaging at least one of a lateral side of the article of merchandise and a front surface of the article of merchandise.

12. A security sensor according to claim 11, wherein each of the retaining arms further comprises a rack portion at a second end opposite the first end that operatively engages a rotatable pinion gear.

13. A security sensor according to claim 12, wherein the rack portions of the retaining arms are disposed opposite one another about the pinion gear such that the retaining arms are moveable in opposite directions in the lateral direction to accommodate a plurality of articles of merchandise having various widths.

14. A security sensor according to claim 10, wherein the retaining arms assembly further comprises a base portion defining a channel for receiving at least a portion of the retaining arms and a cap portion adapted to be attached to the base portion such that the retaining arms are rotatable about a lateral axis relative to the housing to accommodate a plurality of articles of merchandise having various thicknesses.

15. A security sensor according to claim 14, wherein the retaining arms assembly further comprises a torsion spring defining at least a pair of coils that operatively engage the portions of the retaining arms received within the channel of the base portion, the torsion spring comprising at least one leg portion for engaging the base portion and a connecting loop for operatively engaging a locking collar for locking the torsion spring to the portions of the retaining arms and thereby prevent movement of the retaining arms in the lateral direction and rotation of the retaining arms about a lateral axis relative to the housing.

16. A security sensor according to claim 15, wherein the retaining arms assembly further comprises a locking screw and a locking plate, and wherein the locking collar is disposed between the locking screw and the locking plate, and wherein the locking screw operatively engages the locking plate to move the locking collar and the connecting loop of the torsion spring and thereby tighten the coils of the torsion spring about the portion of the retaining arms received within the channel of the base portion to prevent movement of the retaining arms in the lateral direction relative to the housing and rotation of the retaining arms about the lateral axis relative to the housing.

17. A security sensor according to claim 10, further comprising a sensor element disposed at least partially within the internal compartment of the housing, the sensor element providing a state for indicating whether an article of merchandise is retained on the housing.

18. A security sensor according to claim 10, further comprising a power adapter cord for electrically connecting the security sensor to an article of merchandise retained on the housing and for providing electrical power from a power source to the article of merchandise.

19. A security sensor according to claim 10, wherein the housing is supported on a merchandise display stand that is secured to a display fixture.

20. A security sensor according to claim 1, wherein the opposed retaining arms are configured to rotate between stop positions, and wherein the opposed retaining arms are configured to be adjusted to and locked in one of the plurality of desired lateral and rotational positions between the stop positions.

* * * * *